United States Patent
Ma

(12) 
(10) Patent No.: US 6,451,950 B1
(45) Date of Patent: Sep. 17, 2002

(54) POLYMERIC PIGMENT DISPERSANTS HAVING MULTIPLE PIGMENT ANCHORING GROUPS

(75) Inventor: Sheau-Hwa Ma, Chadds Ford, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/610,672

(22) Filed: Jul. 5, 2000

(51) Int. Cl.[7] .............................................. C08F 118/02
(52) U.S. Cl. .................... 526/319; 526/303.1; 526/307; 526/307.2; 526/317.1; 526/318; 526/318.2; 526/319; 526/320; 526/321; 526/328.5; 526/329.7; 427/393.5; 524/5
(58) Field of Search .............................. 526/303.1, 307, 526/307.2, 317.1, 318, 318.2, 319, 320, 318.3, 321, 328.5, 329.7; 427/393.5; 524/5

(56) References Cited

U.S. PATENT DOCUMENTS

| | | | | |
|---|---|---|---|---|
| 4,294,939 A | | 10/1981 | Taniguchi et al. | |
| 4,417,013 A | | 11/1983 | Schuster | |
| 4,839,414 A | | 6/1989 | Bederke et al. | |
| 5,085,698 A | * | 2/1992 | Ma et al. | 106/20 |
| 5,219,945 A | * | 6/1993 | Dicker et al. | 525/276 |
| 5,272,201 A | * | 12/1993 | Ma et al. | 524/505 |
| 5,358,566 A | * | 10/1994 | Tanaka et al. | 106/823 |
| 5,418,277 A | * | 5/1995 | Ma et al. | 524/520 |
| 5,424,364 A | | 6/1995 | Simms et al. | 525/170 |
| 6,132,502 A | * | 10/2000 | Yatake | 106/31.86 |
| 6,245,832 B1 | * | 6/2001 | Suzuki et al. | 523/160 |

FOREIGN PATENT DOCUMENTS

WO   WO 87/05924 A1   10/1987

* cited by examiner

*Primary Examiner*—David W. Wu
*Assistant Examiner*—Tatyana Zalukaeva
(74) *Attorney, Agent, or Firm*—Steven C. Benjamin

(57) ABSTRACT

A polymer dispersant for pigments based on a random copolymer wherein the copolymer has a weight average molecular weight of at least 3000 and comprises a polymeric backbone of primarily acrylic monomers wherein the backbone contains multiple pigment anchoring groups attached thereto including at least one amide group and one or more additional pigment anchoring groups selected from the group consisting of aromatic esters, aromatic amines, and quaternary ammonium salts. These materials disperse a wide variety of pigments and are useful in solvent borne coatings where they can provide improved efficiency of pigment use, lower paint viscosity, and reduced emission of volatile organic solvent.

14 Claims, No Drawings

POLYMERIC PIGMENT DISPERSANTS HAVING MULTIPLE PIGMENT ANCHORING GROUPS

BACKGROUND OF THE INVENTION

This invention relates to polymeric pigment dispersants, more particularly, it relates to random copolymer pigment dispersants having multiple pigment anchoring groups. These dispersants are easy to prepare while also being useful for dispersing a wide variety of pigments.

Polymeric pigment dispersants which are effective for dispersing pigments in organic liquids have been previously known and used to form pigment dispersions that are used in a variety of solvent borne coating compositions. Nowadays, such pigment dispersions are widely used, for example, in exterior solvent borne paints for automobiles and trucks.

Structured polymers such as AB block copolymers and graft copolymers are known to be more effective dispersants, in comparison to random copolymers, as for example, as taught by Simms et al U.S. Pat. No. 5,424,364 issued Jun. 13, 1995. However, their synthesis usually involves more complicated chemistries, more demanding reaction conditions, and usually more expensive reagents. This leads to a less robust and oftentimes more costly manufacturing process.

Therefore, there is still a need to improve the performance of random copolymer pigment dispersants, and in particular to find new random copolymers that are more effective in dispersing a wider range of pigments as well as easy to prepare.

Random copolymer dispersants that have been used in the past contain both polar and relatively non-polar segments randomly placed in the polymer dispersant chain. The polar segments known as pigment anchoring segments are designed to attach the copolymer dispersant to the pigment surface, and the non-polar segments known as stabilizing segments are designed to extend into the surrounding solvent medium to provide steric stabilization of the pigment particles, which keeps the pigments dispersed and prevents the pigment particles from coming close enough to one another to cluster together or flocculate.

It is thought that one way to improve the performance of such dispersants is through more effective binding or anchoring of the dispersant to the pigment surfaces. Pigment surfaces are usually heterogeneous having a range of functional groups. This presents the possibilities for enhancing the binding force of a polymeric dispersant to the pigment surfaces through multiple mechanisms such as acid-base, aromatic, dipole-dipole interactions, hydrogen bonding, etc., and potentially leading to a more versatile dispersant, that is selectively adsorbed by a wider range of pigments, and an improved dispersion system. In this fashion, the present invention provides an alternative approach to structured polymers through the use of a random polymer containing multiple pigment anchoring groups, which supply the dispersant with improved dispersing power and versatility.

SUMMARY OF THE INVENTION

The present invention provides a composition suitable for use as a pigment dispersant, comprising a random copolymer, wherein the copolymer has a weight average molecular weight of about 3,000–100,000 and has both pigment anchoring segments and stabilizing segments randomly distributed in the polymer chain, wherein the (1) the stabilizing segments are non-polar in comparison to the pigment anchoring segments and consist essentially of ethylenically unsaturated monomers that are polymerized into the polymer chain and
(2) the pigment anchoring segments consist essentially of ethylenically unsaturated monomers that are polymerized into the polymer chain and have pigment anchoring groups attached thereto,
wherein the pigment anchoring groups are selected from at least one amide group and one or more additional anchoring groups selected from the group consisting of aromatic esters, aromatic amines, aliphatic amines, and quaternary ammonium groups.

The present invention also provides stable and non-flocculated pigment dispersions formed by combining the pigment dispersant of this invention with any number of commercially available pigments and an appropriate organic liquid carrier. These dispersions are particularly useful in solvent borne coatings, especially automotive paints, where they impart uniform color to the paint and, at the same time, provide improved efficiency of pigment use, lower paint viscosity, and reduced emission of volatile organic solvents, in comparison to standard random copolymer dispersants.

DETAILED DESCRIPTION OF THE INVENTION

The pigment dispersant of this invention comprises a random copolymer preferably produced by a conventional free radical polymerization approach which involves copolymerizing the stabilizing monomers in the presence of the anchoring monomers to form the random structure.

The polymerization is carried out in an organic solvent or solvent blend using conventional polymerization initiators. The reaction mixture is typically held at or below reflux temperature until a random copolymer of desired molecular is formed. The random copolymer of the present invention so formed has a weight average molecular weight of about 3,000 to 100,000, preferably about 5,000 to 60,000.

All molecular weights referred herein are determined by GPC (gel permeation chromatography) using a polymethyl methacrylate standard.

Typical solvents that can be used to form the random copolymer are alcohols such as methanol, ethanol, n-propanol, and isopropanol, ketones such as acetone, butanone, pentanone, hexanone, and methyl ethyl ketone, alkyl esters of acetic, propionic, and butyric acids such as ethyl acetate, butyl acetate, and amyl acetate, ethers such as tetrahydrofuran, diethyl ether, ethylene glycol and polyethylene glycol mono- and dialkyl ethers such as cellosolves and carbitols; and glycols such as ethylene glycol and propylene glycol, or any mixtures thereof.

Any of the commonly used azo or peroxy polymerization initiators can be used for preparation of the random copolymer provided it has solubility in the solution of the solvents and the monomer mixture, and has an appropriate half life at the temperature of polymerization. "Appropriate half life" as used herein is a half life of about 10 minutes to 4 hours. Most preferred are azo type initiators such as 2,2'-azobis (isobutyronitrile), 2,2'-azobis (2,4-dimethylvaleronitrile), 2,2'-azobis (methylbutyronitrile), and 1,1'-azobis (cyanocyclohexane). Examples of peroxy based initiators are benzoyl peroxide, lauroyl peroxide, t-butyl peroxypivalate, t-butyl peroctoate which may also be used.

The stabilizing segment of the random copolymer is soluble in the selected organic liquid carrier and is prepared from ethylenically unsaturated monomer(s) such as alkyl methacrylates and acrylates, cycloaliphatic methacrylates and acrylates and aryl methacrylates and acrylates, as are listed hereinafter. The term "segment" as used herein means one monomer or a cluster of more than 1 monomers.

Typical alkyl methacrylates that can be used have 1–18 carbon atoms in the alkyl group such as methyl methacrylate, ethyl methacrylate, propyl methacrylate, isopropyl methacrylate, n-butyl methacrylate, isobutyl methacrylate, t-butyl methacrylate, pentyl methacrylate, hexyl methacrylate, 2-ethyl hexyl methacrylate, nonyl methacrylate, lauryl methacrylate, stearyl methacrylate, 2-(2-ethoxy ethoxy)ethyl methacrylate, ethoxytriethyleneglycol methacrylate, and the like. Cycloaliphatic methacrylates can be used such as trimethylcyclohexyl methacrylate, t-butyl cyclohexyl methacrylate, cyclohexyl methacrylate, isobornyl methacrylate, and the like. Aryl methacrylates can also be used such as benzyl methacrylate, phenyl methacrylate, and the like.

Typical alkyl acrylates that can be used have 1–18 carbon atoms in the alkyl group such as methyl acrylate, ethyl acrylate, propyl acrylate, isopropyl acrylate, n-butyl acrylate, isobutyl acrylate, t-butyl acrylate, 2-ethyl hexyl acrylate, nonyl acrylate, lauryl acrylate, 2-(2-ethoxyethoxy) ethyl acrylate, and the like. Cycloaliphatic acrylates can be used such as cyclohexylacrylate, trimethylcyclohexylacrylate, t-butyl cyclohexyl acrylate, and the like. Aryl acrylates such as benzyl acrylate, 2-phenoxyethyl acrylate, and the like. Other polymerizable ethylenically unsaturated monomers can also be used such as vinyl aromatics such as styrene, t-butyl styrene, vinyl toluene, and the like, can also be used. Mixtures of any of the above can also be used.

The anchoring segment of the random copolymer contains multiple pigment anchoring groups including at least one amide group and one or more additional pigment anchoring groups selected from the group of aromatic esters, aromatic amines, aliphatic amines, and quaternary ammonium groups. The anchoring segment can be prepared by copolymerizing ethylenically unsaturated monomers containing the appropriate anchoring groups into the polymer chain and by reacting functional groups on the anchoring monomers with suitable pigment anchoring group precursor compounds following the formation of the random copolymer structure, or both.

The amide anchoring groups in particular are preferably obtained by copolymerizing ethylenically unsaturated amide containing monomer(s) into the polymer chain such as acrylamides and methacrylamides and other vinyl monomers containing either a cyclic or acyclic amide group.

Typical acrylamide or methacrylamide monomers that can be used to introduce acyclic amide groups into the copolymer are represented by the formula

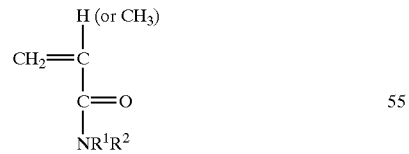

where $R^1$ and $R^2$ are each independently selected from the group consisting of hydrogen, alkyl group, aryl group, arylalkyl group, and alkylaryl group having 1 to 20 carbon atoms, and optionally containing one or more substituents that do not interfere with the polymerization process. Such substituents may include alkyl, hydroxy, amino, ester, acid, acyloxy, amide, nitrile, halogen, alkoxy, etc. Useful examples include methacrylamides such as N-methylmethacrylamide, N-ethylmethacrylamide, N-octylmethacrylamide, N-dodecylmethacrylamide, N-(isobutoxymethyl) methacrylamide, N-phenylmethacrylamide, N-benzylmethacrylamide, N,N-dimethylmethacrylamide, and the like; and acrylamides such as N-methyl acry N-ethylacrylamide, N-t-butylacrylamide, N-(isobutoxymethyl) acrylamide, N,N-dimethylacrylamide, N,N-diethylacrylamide, N,N-dibutyl acrylamide, and the like.

Typical vinyl monomers that can be used to introduce cyclic amide groups into the copolymer include acrylic or methacrylic or N-vinyl monomers. The acrylic and methacrylic monomers are represented by formula

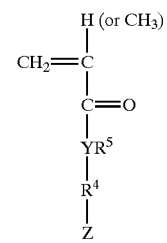

where Y is O or N, $R^4$ is selected from the group consisting of alkyl group, aryl group, arylalkyl group, and alkylaryl group having 1 to 20 carbon atoms and may contain substituents which do not interfere with polymerization such as hydroxy, amino, ester, acid, acyloxy, amide, nitrile, halogen, alkoxy, etc., $R^5$ does not exist when Y is O but when Y is N, $R^5$ is selected from the group consisting of hydrogen, alkyl group, aryl group, arylalkyl group, and alkylaryl group having 1 to 20 carbon atoms and may contain substituents which do not interfere with polymerization such as hydroxy, amino, ester, acid, acyloxy, amide, nitrile, halogen, alkoxy, etc., and Z is a radical center connected to structure (1) or (2) below.

The N-vinyl monomers are represented by formula

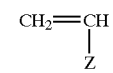

where Z is a radical center connected to structure (1) below. The most useful example is N-vinyl-2-pyrrolidinone.

Structures (1) or (2), respectively, are represented by

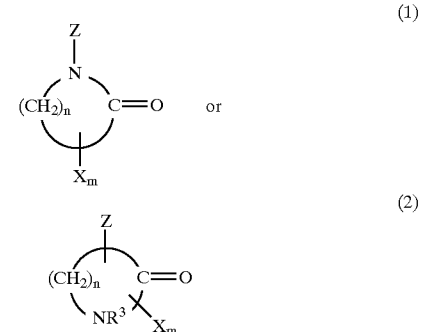

where n=3–7, preferably 3–5, m=0–3, X is a substituent on the cyclic structure and may be selected from the group consisting of alkyl group, aryl group, arylalkyl group, and alkylaryl group having 1 to 20 carbon atoms, and may contain substituents which do not interfere with polymerization such as hydroxy, amino, ester, acid, acyloxy, amide, nitrile, halogen, alkoxy, etc., $R^3$ is selected from the group consisting of hydrogen, alkyl group, aryl group, arylalkyl group, and alkylaryl group having 1 to 20 carbon atoms, and may contain substituents which do not interfere with polymerization such as hydroxy, amino, ester, acid, acyloxy, amide, nitrile, halogen, alkoxy, etc., and Z is a radical center connected to the vinyl monomer structures referenced above.

The concentration of the amide anchoring groups required will vary from case to case depending upon the desired degree of pigment anchoring necessary for the particular end use application. Typically, the concentration of the monomers that are used to form the amide anchoring groups in the random copolymer is at least about 1% by weight, based on the total weight of the random copolymer, to impart appropriate pigment anchoring functionality to the random copolymer. At lower concentrations, there may not be sufficient interaction with the pigment to avoid flocculation, particularly in more polar solvents. At higher concentrations, generally above 30% by weight, low polarity solvents may not be satisfactory solvents for the dispersants. The preferred concentration is between about 2 and 20% by weight, based on the total weight of the random copolymer.

The copolymer also contains one or more additional pigment anchoring groups selected from the group consisting of aromatic ester groups, aromatic amine groups, aliphatic amine groups, and cationic quaternary ammonium groups, or any mixtures thereof. These groups are preferably formed by reacting appropriate functional groups built into the anchoring segment with suitable pigment anchoring group precursor compounds following the formation of the random copolymer structure.

The aromatic ester anchoring groups, in particular, can be, and preferably are, attached as pendant groups to the random copolymer by reacting epoxy functional groups built into the anchoring segment with an aromatic carboxylic acid. The reaction conditions should be chosen so that 100% of the epoxy groups are reacted (i.e., esterified), or as close to 100% as can be reasonably achieved, leaving essentially no unreacted epoxy groups in the dispersant molecule which can have negative effects on dispersant performance. A catalytic amount of a tertiary amine or a quaternary ammonium salt can be advantageously used to accelerate the reaction and drive it to completion. A useful example is benzyltrimethyl ammonium hydroxide. Typical epoxy functional monomers that can be used to introduce reactive epoxy groups are glycidyl methacrylate and glycidyl acrylate. The aromatic carboxylic acids useful herein may be unsubstituted or may contain substituents, such as, e.g., nitro groups, hydroxy, amino, ester, acryloxy, amide, nitrile, halogen, haloalkyl, alkoxy, and the like. Preferred aromatic carboxylic acids are benzoic acid, 2-nitrobenzoic acid, 3-nitrobenzoic acid, 4-nitrobenzoic acid, 3,5-dinitrobenzoic acid, 1-naphthoic acid, 3-chlorobenzoic acid, 4-biphenyl carboxylic acid, n-phthaloyl glycine, 4-sulfamido benzoic acid, and the like.

The aromatic amine anchoring groups can be, and preferably are, attached to the random copolymer by reacting epoxy functional groups provided on the copolymer with a secondary aromatic amine. Again, the reaction conditions should be chosen so that substantially all of the epoxy groups are reacted. The epoxy groups can be placed on the random copolymer by the method described above. The epoxy groups are then reacted in a subsequent reaction with the secondary aromatic amine precursor compounds to form a random copolymer having pendant tertiary aromatic amine functionality. The secondary aromatic amines useful in this invention may be unsubstituted or may contain substituents such as, e.g., hydroxy, ester, acyloxy, amide, nitrile, halogen, haloalkyl, alkoxy, and the like. Preferred secondary aromatic amines include N-benzyl methylamine, N-benzylethanolamine, N,N-dibenzylamine, 2-(2-methylaminoethyl)pyridine, 1-phenylpiperazine, 1-benzyl piperazine, 3-(3-pyridylmethylamines) propionitrile, and the like. Alternatively, the pendant aromatic amine groups may be introduced to the random copolymer by using instead a precursor compound containing both a tertiary aromatic amine and a carboxylic acid functional group in the esterification reaction described above. Useful examples of such compounds include nicotinic acid, picolinic acid, isonicotinic acid, indole-3-acetic acid, and the like. Alternatively, aromatic amine containing monomers, such as 4-aminostyrene, 2-vinyl pyridine, 4-vinyl pyridine, and the like, may be directly copolymerized into the random copolymer to form the aromatic amine anchoring group, if desired.

The aliphatic amine anchoring groups can be, and preferably are, attached to the backbone by addition of suitable ethylenically unsaturated monomers which contain tertiary aliphatic amine functional groups during polymerization of the backbone. Acrylic monomers are generally preferred and in particular tertiary amine functional acrylate and methacrylate monomers. Preferred monomers include N,N-dimethylaminoethyl acrylate, N,N-dimethylaminoethyl methacrylate, diethylaminoethyl acrylate, N,N-diethylaminoethyl methacrylate, N-t-butylaminoethyl methacrylate, 2-N-morpholinoethyl acrylate, 2-N-morpholinoethyl methacrylate, and the like. Alternatively, the aliphatic amine anchoring groups may be obtained by reacting a secondary aliphatic amine with a copolymer containing epoxy groups as described above.

The amine anchoring groups prepared above can be further reacted with an alkylation agent to produce a random copolymer containing pendant cationic quaternary ammonium groups as the additional pigment anchoring group. Quaternary ammonium anchoring groups can be, and preferably are, attached to the random copolymer by contacting the tertiary amine functional groups built into the backbone with an alkylation agent. Total alkylation should be at least about 30% of the tertiary amine moieties, preferably at least about 50%. The tertiary amine functional groups are preferably converted to the quaternary state after the formation of the basic copolymer structure by bringing the cationic precursor unit into contact with conventional alkylation agents, such as aralkyl halides, alkyl halides, alkyl toluene sulfonate, or trialkyl phosphates halides. Alkylation agents which have been found to be particularly satisfactory include, benzyl chloride, methyl toluene sulfonate, and dimethyl sulfate.

Other possibilities for attaching the forgoing pigment anchoring groups to the random copolymer will be apparent to persons skilled in the art.

As with the amide anchoring groups, the concentration of the additional anchoring groups required will vary from case to case depending upon the desired degree of pigment anchoring necessary for the particular end use application. Typically, the concentration of the monomers that are used to form the one or more additional anchoring groups in the random copolymer is at least about 1% by weight, based on the total weight of the random copolymer, to impart appropriate pigment anchoring functionality to the random copolymer. At lower concentrations, there may not be sufficient interaction with the pigment to avoid flocculation, particularly in more polar solvents. At higher concentrations, generally above 30% by weight, low polarity solvents may not be satisfactory solvents for the dispersants. The preferred concentration is between about 2 and 20% by weight, based on the total weight of the random copolymer.

In addition to the anchoring groups above, the random copolymer may also, and preferably does, contain other polar functional groups, such as hydroxyl groups, capable of reacting with film forming binder components in the paint composition to crosslink the dispersant into the film-forming binder matrix and become a permanent part of the film. This enhances film adhesion, improves the overall mechanical properties of the paint in general, and prevents deterioration or delamination of the film upon aging, as may occur if the dispersant remained an unreacted component. Typical monomers that can be used to introduce hydroxyl groups into the copolymer include hydroxy functional methacrylates such as 2-hydroxyethyl methacrylate, 3-hydroxypropyl methacrylate, 4-hydroxylbutyl methacrylate. Hydroxy functional acrylates can also be used such as 2-hydroxyethyl acrylate, 3-hydroxypropyl acrylate, 4-hydroxybutyl acrylate, and the like. The copolymer preferably contains up to about 30% by weight, based on the total weight of the random copolymer, of monomers containing hydroxyl groups. This generally translates to a hydroxyl value of about 10 to 150.

Particularly useful random copolymers include the following:

a random copolymer of polymerized monomers consisting essentially of 50–95% by weight of alkyl acrylate or methacrylate, 2–20% by weight of cyclic or acyclic amide functional monomer, 2–20% by weight of glycidyl methacrylate, and 1–10% by weight of hydroxy functional acrylate or methacrylate, and having a weight average molecular weight of about 5,000–60,000. The glycidyl groups of the glycidyl methacrylate constituent are reacted with either aromatic carboxylic acid, secondary aromatic amine, or secondary aliphatic amine on a 1/1 molar equivalent basis to form the additional anchoring groups. Any of the amine anchoring groups so formed may be further reacted with an alkylation agent to convert all or a portion of the amine groups to quaternary ammounium groups; and a random copolymer of polymerized monomers consisting essentially of 55–96% by weight of alkyl acrylate or methacrylate, 2–20% by weight of cyclic or acyclic amide functional monomer, 1–15% by weight of aromatic or aliphatic amine functional acrylate or methacrylate monomer, and 1–10% by weight of hydroxy alkyl acrylate or methacrylate, and having a weight average molecular weight of about 5,000–60,000. The amine anchoring groups may be further reacted with an alkylation agent to convert all or a portion of the amine groups to quaternary ammounium groups.

The random copolymers of this invention are broadly compatible with a variety of film forming polymers that are conventionally used in solvent borne coatings and in particular, compatible with acrylic polymers that are conventionally used in automotive coatings, selectively adsorbed by a wide range of pigments, soluble in a wide range of solvents, and not displaced from pigment surfaces by polar solvents. While not wishing to be bound by any particular theory, the random polymers of the present invention when used as pigment dispersants are thought to work by strongly anchoring onto the pigment surface and forming a layer of polymer surrounding the pigment particle, which layer extends into the surrounding solvent medium to provide steric stabilization of the pigment particles against flocculation. The pigment particles then are not able to come close enough to one another to flocculate. The multiple pigment anchoring groups employed herein have been found to interact effectively with a much wider range of pigments in comparison to conventional dispersants, which enables the random copolymers of the present invention to be selectively adsorbed by a wider range of pigments and not be displaced from pigment surfaces by polar solvents or other polar functional groups contained in the final paint composition which could compete for adsorption on the pigment surface. Stable and non-flocculated pigment dispersions and solvent borne paint compositions can thus be readily formed therefrom.

To form a pigment dispersion or a millbase, pigments are added to the random copolymer in the customary organic solvent or solvent blend and are dispersed using conventional techniques such as high speed mixing, ball milling, sand grinding, attritor guiding, or two or three roll milling. The resulting pigment dispersion has a pigment to dispersant binder weight ratio of about 0.1/100 to 2000/100.

Any of the conventional pigments used in paints can be used to form the pigment dispersion. Examples of suitable pigments include metallic oxides such as titanium dioxide, iron oxides of various colors, and zinc oxide; carbon black; filler pigments such as talc, china clay, barytes, carbonates, and silicates; a wide variety of organic pigments such as quinacridones, phtalocyanines, perylenes, azo pigment, and indanthrones carbazoles such as carbazole violet, isoindolinones, isoindolons, thioindigio reds, and benzimidazolinones; and metallic flakes such as aluminum flake, pearlescent flakes, and the like.

It may be desirable to add other optical ingredients to the pigment dispersion such as antioxidants, flow control agents, UV stabilizers, light quenchers and absorbers, and rheology control agents such as fumed silica and microgels. Other film forming polymers can also be added such as acrylics, acrylourethanes, polyester urethanes, polyesters, alkyds, polyethers and the like.

Pigment dispersions of this invention can be added to a variety of solvent borne coating or paint compositions such as primers, primer surfacers, topcoats which may be monocoats, or basecoats of a clearcoat/basecoat finish. These compositions may contain film-forming polymers such as hydroxy functional acrylic and polyester resins and crosslinking agents such as blocked isocyanates, alkylated melamines, polyisocyanates, epoxy resins, and the like. Preferably, the random copolymer contains functional groups that will become part of the final network structure by reacting with the crosslinkers.

The following examples illustrate the invention. All parts and percentages are on a weight basis unless otherwise indicated. All molecular weights are determined by GPC (gel permeation chromatography) using a polymethyl methacrylate standard. All viscosity measurements are reported using a Gardner Holtz scale.

EXAMPLES

Example 1

Preparation of a Random Copolymer with Cyclic Amide, Amine, and Quaternized Ammonium Groups This example shows the preparation of a random copolymer of this invention containing amide, amine, and quaternized amine groups, specifically 1-vinyl 2-pyrrolidinone-co-methyl acrylate-co-2-hydroxyethyl acrylate-co-N,N-dimethylaminoethyl acrylate (methyl p-toluenesulfonate)- co-butyl methacrylate-co-methyl methacrylate, 6.76/6.76/7.73/2.90(3.40)/50.72/21.74% by weight.

A 2-liter flask was equipped with a thermometer, stirrer, additional funnels, heating mantle, reflux condenser and a means of maintaining a nitrogen blanket over the reactants. The flask was held under nitrogen positive pressure and the following ingredients were employed.

|  | Weight (gram) |
|---|---|
| Portion 1 | |
| butyl acetate | 350.0 |
| Portion 2 | |
| 1-vinyl-2-pyrrolidinone | 50.4 |
| methyl acrylate | 50.4 |
| N,N-dimethylaminoethyl acrylate | 21.6 |
| 2-hydroxyethyl acrylate | 57.6 |
| butyl methacrylate | 378.0 |
| methyl methacrylate | 162.0 |
| Portion 3 | |
| t-butyl peroxy isobutyrate (75% by wt, Elf Atochem North America, Inc., Philadelphia, PA) | 14.4 |
| butyl acetate | 100.0 |
| Portion 4 | |
| methyl p-toluenesulfonate (Aldrich Chemical Co., Inc. Milwaukee, WI) | 25.3 |
| propyleneglycol monomethyl ether acetate | 280.9 |
| Total | 1490.6 |

Portion 1 was charged to the flask and the mixture was heated to reflux temperature and refluxed for about 10 minutes. Portions 2 and 3 were simultaneously added over 3 hours while the reaction mixture was held at reflux temperature. The reaction mixture was refluxed for about 1.5 hours. Portion 4 mixture was added and refluxed for another 3 hours. After cooling the polymer solution was filled out to yield a 50.4% polymer solution with a Gardner-Holtz viscosity of Z.

Example 2
Preparation of a Random Copolymer with Cyclic Amide and Amine Groups

This example shows the preparation of a random copolymer of this invention containing amide and amine groups, specifically 1-vinyl 2-pyrrolidinone-co-2-hydroxyethyl acrylate-co-N,N-dimethylaminoethyl acrylate-co-butyl methacrylate-co-methyl methacrylate, 14.0/8.0/4.0/37.0/37.0% by weight.

A 2-liter flask was equipped as in Example 1. The flask was held under nitrogen positive pressure and the following ingredients were employed.

|  | Weight (gram) |
|---|---|
| Portion 1 | |
| butyl acetate | 350.0 |
| Portion 2 | |
| 1-vinyl-2-pyrrolidinone | 100.8 |
| N,N-dimethylaminoethyl acrylate | 28.8 |
| 2-hydroxyethyl acrylate | 57.6 |
| butyl methacrylate | 266.4 |
| methyl methacrylate | 266.4 |
| Portion 3 | |
| t-butyl peroxy isobutyrate (75% by wt, Elf Atochem North America, Inc., Philadelphia, PA) | 14.4 |
| butyl acetate | 100.0 |
| Portion 4 | |
| butyl acetate | 255.6 |
| Total | 1440.0 |

Portion 1 was charged to the flask and the mixture was heated to reflux temperature and refluxed for about 10 minutes. Portions 2 and 3 were simultaneously added over 3 hours while the reaction mixture was held at reflux temperature. The reaction mixture was refluxed for about 1.5 hours. Portion 4 mixture was added. After cooling the polymer solution was filled out to yield a 50.5% polymer solution with a Gardner-Holtz viscosity of Y.

Example 3
Preparation of a Random Copolymer with Acyclic Amide and Aromatic Ester Groups This example shows the preparation of a random copolymer of this invention containing amide and aromatic ester groups, specifically N,N-dimethyl acrylamide-co-2-hydroxyethyl acrylate-co-glycidyl methacrylate (p-nitrobenzoic acid)-co-butyl methacrylate-co-methyl methacrylate, 10.52/7.01/10.52(12.36)/29.80/29.80% by weight.

A 2-liter flask was equipped as in Example 1. The flask was held under nitrogen positive pressure and the following ingredients were employed.

|  | Weight (gram) |
|---|---|
| Portion 1 | |
| butyl acetate | 280.0 |
| Portion 2 | |
| N,N-dimethyl acrylamide | 76.8 |
| glycidyl methacrylate | 76.8 |
| 2-hydroxyethyl acrylate | 51.2 |
| butyl methacrylate | 217.6 |
| methyl methacrylate | 217.6 |
| Portion 3 | |
| t-butyl peroxy isobutyrate (75% by wt, Elf Atochem North America, Inc., Philadelphia, PA) | 12.8 |
| butyl acetate | 100.0 |
| Portion 4 | |
| p-nitrobenzoic acid (Aldrich Chemical Co. Inc., Milwaukee, wI) | 92.1 |
| Benzyltrimethylammonium hydroxide (40% solution in methanol, Aldrich Chemical Co. Inc., Milwaukee, WI) | 11.3 |
| propylene carbonate | 240.0 |
| butyl acetate | 84.2 |
| Total | 1460.3 |

Portion 1 was charged to the flask and the mixture was heated to reflux temperature and refluxed for about 10 minutes. Portions 2 and 3 were simultaneously added over 3 hours while the reaction mixture was held at reflux temperature. The reaction mixture was refluxed for about 60 minutes. Portion 4 mixture was added and refluxed for another 3 hours. After cooling the polymer solution was filled out to yield a 52.8% polymer solution with a Gardner-Holtz viscosity of Z2+3/4. The random copolymer before reaction with p-nitrobenzoic acid had a 32,853 Mw and 12,033 Mn.

Example 4
Preparation of a Random Copolymer with Cyclic Amide and Aromatic Amine Groups This example shows the preparation of a random copolymer of this invention containing amide and aromatic amine groups, specifically 1-vinyl2–2-pyrrolidinone-co-2-hydroxyethyl acrylate-co-glycidyl methacrylate (N-benzylmethylamine)-co-butyl methacrylate-co-methyl methacrylate, 11.51/7.67/4.80(4.09)/35.97/35.97% by weight.

A 2-liter flask was equipped as in Example 1. The flask was held under nitrogen positive pressure and the following ingredients were employed.

|  | Weight (gram) |
|---|---|
| Portion 1 |  |
| butyl acetate | 320.0 |
| Portion 2 |  |
| 1-vinyl-2-pyrrolidinone | 86.4 |
| glycidyl methacrylate | 36.0 |
| 2-hydroxyethyl acrylate | 57.6 |
| butyl methacrylate | 270.0 |
| methyl methacrylate | 270.0 |
| Portion 3 |  |
| t-butyl peroxy isobutyrate (75% by wt, Elf Atochem North America, Inc., Philadelphia, PA) | 14.4 |
| butyl acetate | 100.0 |
| Portion 4 |  |
| N-benzylmethylamine (Aldrich Chemical Co. Inc., Milwaukee, WI) | 31.0 |
| butyl acetate | 315.8 |
| Total | 1501.2 |

Portion 1 was charged to the flask and the mixture was heated to reflux temperature and refluxed for about 10 minutes. Portions 2 and 3 were simultaneously added over 3 hours while the reaction mixture was held at reflux temperature. The reaction mixture was refluxed for about 60 minutes. Portion 4 mixture was added and refluxed for another 3 hours. After cooling the polymer solution was filled out to yield a 51.4% polymer solution with a Gardner-Holtz viscosity of Z-1/4. The random copolymer before reaction with N-benzylmethylamine had a 33,564 Mw and 12,739 Mn.

Comparative Example
Preparation of a Random Copolvmer with No Specific Pigment Anchoring Groups This example shows the preparation of a random copolymer having no specific pigment anchoring groups of this invention, specifically methyl acrylate-co-2-hydroxyethyl acrylate-co-butyl methacrylate-co-methyl methacrylate, 18.0/8.0/37.0/37.0% by weight.

A 2-liter flask was equipped as in Example 1. The flask was held under nitrogen positive pressure and the following ingredients were employed.

|  | Weight (gram) |
|---|---|
| Portion 1 |  |
| butyl acetate | 350.0 |
| Portion 2 |  |
| methyl acrylate | 129.6 |
| 2-hydroxyethyl acrylate | 57.6 |
| butyl methacrylate | 266.4 |
| methyl methacrylate | 266.4 |
| Portion 3 |  |
| t-butyl peroxy isobutyrate (75% by wt, Elf Atochem North America, Inc., Philadelphia, PA) | 14.4 |
| butyl acetate | 100.0 |
| Portion 4 |  |
| butyl acetate | 255.6 |
| Total | 1440.0 |

Portion 1 was charged to the flask and the mixture was heated to reflux temperature and refluxed for about 10 minutes. Portions 2 and 3 were simultaneously added over 3 hours while the reaction mixture was held at reflux temperature. The reaction mixture was refluxed for another 1.5 hours. Portion 4 mixture was added. After cooling the polymer solution was filled out to yield a 51.0% polymer solution with a Gardner-Holtz viscosity of Z- 1/4. The random copolymer had a 60,672 Mw and 15,705 Mn.

Example 5
Evaluation of Dispersant Properties

The dispersant effectiveness was determined by sand-grinding a mixture of pigment, solvent, and dispersant, and observing the dispersion quality under an Olympus microscope, 40X. The well dispersed system would have a uniform appearance and the pigment particles would show vigorous Brownian motion. In contract, the flocculated systems would have islands of flocculated pigment chunks interspersed with areas of relatively clear solvent.

The dispersion samples were prepared by the following procedure. To a 2 oz. glass bottle, 15 gm of sand, 20 gm of butyl acetate, 2 gm of pigment and 1 gm of the random copolymer dispersant solution were added. The bottle was sealed and agitated on a Red Devil plant shaker for 15 minutes.

| Pigment | Ex 1 | Ex 2 | Ex 3 | Ex 4 | CEx |
|---|---|---|---|---|---|
| 1 | D | F | F | F | F |
| 2 | D | D | D | D | F |
| 3 | D | D | D | D | D |
| 4 | D | F | F | F | F |
| 5 | D | D | F | F | F |
| 6 | F | D | F | F | F |
| 7 | D | D | D | D | F |
| 8 | D | D | D | D | D |
| 9 | D | D | D | D | D |
| 10 | D | D | F | F | F |
| 11 | D | D | D | D | D |
| 12 | D | D | F | F | F |
| 13 | F | F | F | F | F |

-continued

| Pigment | Ex 1 | Ex 2 | Ex 3 | Ex 4 | CEx |
|---------|------|------|------|------|-----|
| 14 | D | D | D | D | D |
| 15 | D | D | D | D | F |

D: Deflocculated or dispersed
F: Flocculated

1. Irgazin DDP Red BO (Ciba-Geigy Corp., Pigment Div., Newport, Del.)
2. Raven 5000 carbon black (Columbian Chemicals Co., Atlanta, Ga.))
3. Titanium dioxide R706 (DuPont Co., Wilmington, Del.)
4. Sunfast green 7 (Sun Chemical Corp., Cincinnati, Ohio))
5. Endurophthal blue BT-617D (Clariant Corp., Coventry, R.I.)
6. Irgazin blue ATC (Ciba-Geigy Corp., Pigment Div., Newport, Del.)
7. Magenta RT-355D (Ciba-Geigy Corp., Pigment Div., Newport, Del.)
8. Perylene maroon R-6436 (Bayer Corp., Pittsburgh, Pa.)
9. Sicotrans red (BASF Corp., Colorant Division, Mount Olive, N.J.))
10. Hostaperm yellow H-3G (Clariant Corp., Coventry, R.I.)
11. Irgacolor yellow (Ciba-Geigy Corp., Pigment Div., Newport, Del.)
12. Irgazin blue X-3367 (Ciba-Geigy Corp., Pigment Div., Newport, Del.)
13. Violet RT-101D (Ciba-Geigy Corp., Pigment Div., Newport, Del.)
14. Bayferrox 3920 (Bayer Corp., Pittsburgh, Pa.)
15. Monastral magenta RT-143D (Ciba Geigy Corp., Pigment Div., Newport, Del.)

The above test results show that the dispersants with multiple types of pigment anchoring groups of this invention are much more efficient in their dispersing power in comparison to the polymers with no specific pigment anchoring groups in the Comparative Example.

Various modifications, alterations, additions or substitutions of the components if the compositions of this invention will be apparent to those skilled in the art without departing from the spirit and scope of this invention. This invention is not limited by the illustrative embodiments set forth herein, but rather is defined by the following claims.

What is claimed is:

1. A composition for use as a pigment dispersant in solvent borne systems, comprising a random copolymer having both pigment anchoring segments and stabilizing segments in a polymer chain, wherein the
   (1) the stabilizing segments are relatively non-polar in comparison to the pigment anchoring segments and consist essentially of ethylenically unsaturated monomers that are polymerized into the polymer chain and
   (2) the pigment anchoring segments consist essentially of ethylenically unsaturated monomers that are polymerized into the polymer chain and have pigment anchoring groups bonded thereto,
       wherein the pigment anchoring groups are selected from at least one amide group and one or more additional anchoring groups selected from the group consisting of aromatic esters, aromatic amines, and quaternary ammonium groups.

2. The composition of claim 1 wherein the concentration of monomers that are used to form the amide anchoring groups is at least about 1% by weight, based on the total weight of the random copolymer.

3. The composition of claim 1 wherein the concentration of monomers that are used to form the amide anchoring groups is about 2–20% by weight, based on the total weight of the random copolymer.

4. The composition of claim 1 wherein the concentration of monomers that are used to form the one or more additional anchoring groups is at least about 1% by weight, based on the total weight of the random copolymer.

5. The composition of claim 1 wherein the concentration of monomers that are used to form the one or more additional anchoring groups is about 2–20% by weight, based on the total weight of the random copolymer.

6. The composition of claim 1 wherein the copolymer is formed mainly from acrylic or methacrylic monomers.

7. The composition of claim 1 wherein the amide anchoring group is a cyclic or acylic amide.

8. The composition of claim 1 wherein the copolymer has a weight average molecular weight of about 3,000–100,000.

9. The composition of claim 1 wherein the copolymer has a weight average molecular weight of about 5,000–60,000.

10. The composition of claim 1 wherein the copolymer further contains up to 30% by weight, based on the total weight of the random copolymer, of hydroxyl functional monomers copolymerized into the polymer dispersant chain.

11. A composition for use as a pigment dispersant in solvent borne systems, comprising a random copolymer having a weight average molecular weight of at least 3,000 and both pigment anchoring segments and stabilizing segments in a polymer chain, wherein
    (1) the stabilizing segments are relatively non-polar in comparison to the pigment anchoring segments and consist essentially of ethylenically unsaturated monomers that are polymerized into the polymer chain and
    (2) the pigment anchoring segments consist essentially of ethylenically unsaturated monomers that are polymerized into the polymer chain and have pigment anchoring groups bonded thereto,
        wherein the pigment anchoring groups are selected from at least one cyclic or acyclic amide group and one or more additional anchoring groups selected from the group consisting of aromatic esters, aromatic amines, and quaternary ammonium groups.

12. The composition of claim 11 wherein the random copolymer is formed primarily from acrylic or methacrylic monomers.

13. A pigment dispersion comprising a pigment in an organic solvent dispersed by means of a composition of claim 1.

14. A solvent borne coating composition comprising the pigment dispersion of claim 13.

* * * * *